United States Patent [19]

Mobarry

[11] Patent Number: 4,740,834
[45] Date of Patent: Apr. 26, 1988

[54] VIDEO PROGRAM DISTRIBUTION

[76] Inventor: Robert G. Mobarry, 1561 Harriet La., Anaheim, Calif. 92802

[21] Appl. No.: 330,776

[22] Filed: Dec. 14, 1981

[51] Int. Cl.⁴ .............................................. H04M 1/44
[52] U.S. Cl. ......................................... 358/84; 358/86; 455/5
[58] Field of Search ................... 358/84, 86; 455/4, 5, 455/6

[56] References Cited

U.S. PATENT DOCUMENTS

| | | | |
|---|---|---|---|
| 3,886,302 | 5/1975 | Kosco | 455/5 |
| 4,135,157 | 1/1979 | dem Toomder | 358/86 |
| 4,361,851 | 11/1982 | Asip et al. | 455/2 |

Primary Examiner—Edward L. Coles, Sr.

[57] ABSTRACT

A video program distribution system is described in which the video programs in the form of video signal modulation on carrier waves is applied to a common video transmission line and, by that line, to a remote switching station, or street unit, associated with each of the system's customers. each customer has a video transmission extension line which interconnects his television receiver or monitor with the remote switching station. The remote switching station includes switches which can be actuated from the sending station for controlling whether or not programs are passed through the remote switching station from the common transmission line to a particular customer. In addition, the remote switching station includes means for recording customer preferences and for reporting those preferences to the sending station.

14 Claims, 1 Drawing Sheet

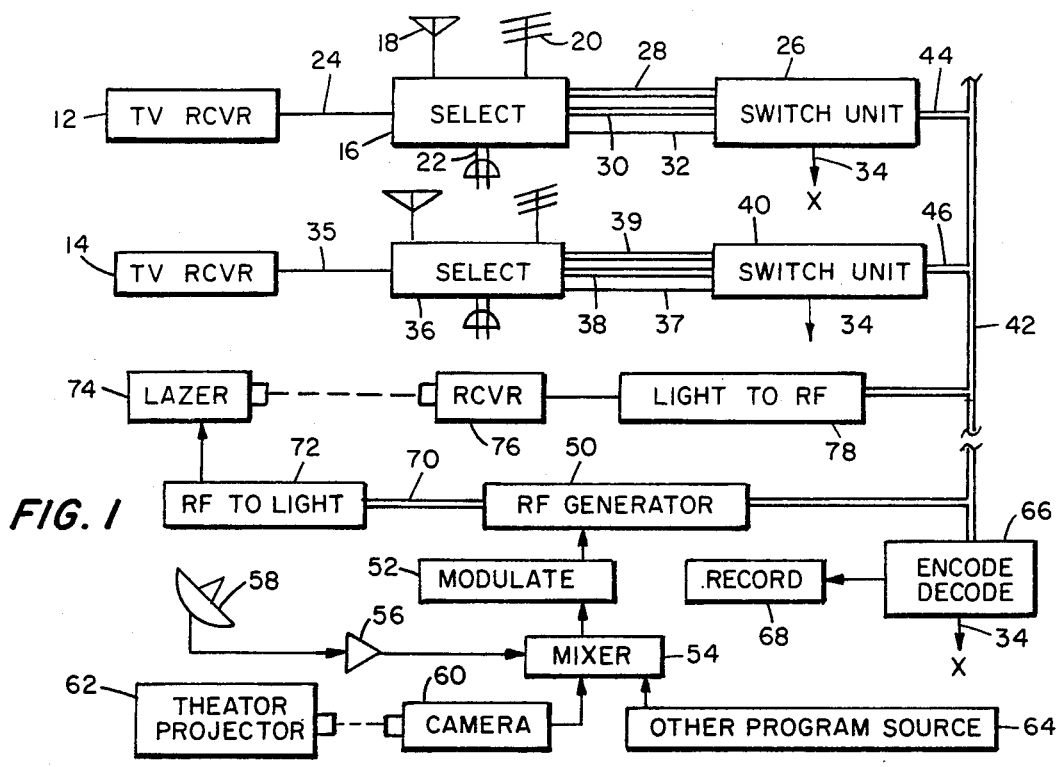
FIG. 1
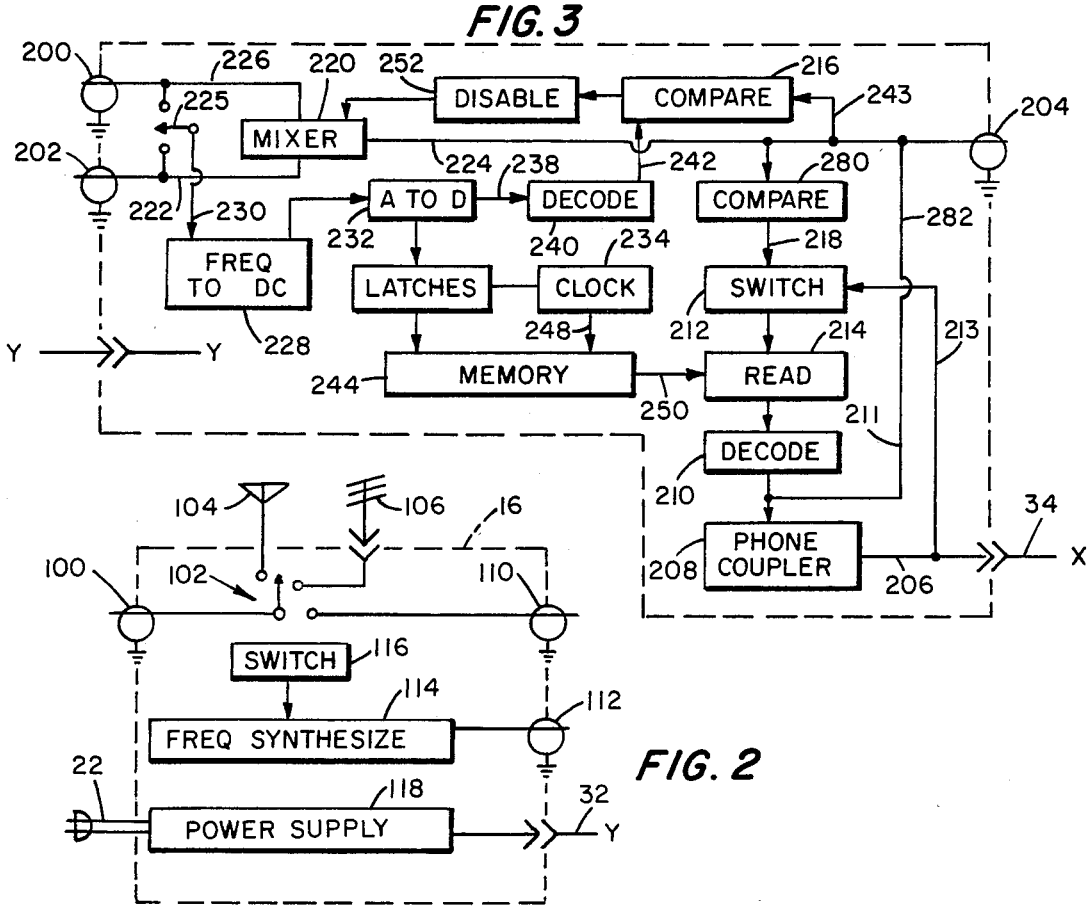
FIG. 3
FIG. 2

4,740,834

VIDEO PROGRAM DISTRIBUTION

TECHNICAL FIELD

This invention relates to methods and apparatus for distributing video program material. It relates, in particular, to the problem of supplying a selection of programs to a number of receivers through a common transmission line.

BACKGROUND ART

The competition for television audiences, and the difficulty in transmitting wireless television signals to all potential viewers has combined to create a "cable television" market. The cables are capable of conducting signals in a very broad band width from direct current to the gig-a-Hertz range. It is not difficult to transmit many video programs, and the accompanying audio material, simultaneously on a single line. Each modulates a carrier signal of different frequency. In most cable systems, the program material constitutes commercial television program material taken "off the air" and is transmitted to subscribers at television channel frequencies, or frequencies that are converted to television frequencies at the television receiver, to permit signal detection with standard television receivers.

Thus, commercial television programs are available as program material for the cable systems. But, in the case of most cable systems, that is the only economically available source, whereby most cable television merely duplicates broadcasted programs. Both systems use the same receiver and compete for the same audience. One receives its program material from the other, which gives rise to difficult questions about compensation and the economics of program creation.

There is an alternate source of program material. The motion picture industry has a highly developed system and network for distribution of its products on a local community, and even a neighborhood, basis. If the motion pictures that are available to, and are being displayed by, local theaters can be introduced into the local cable television systems, an alternate source of program material will have been made available. That can be done readily with current technology, but there is little motive for the film distribution industry to make good programs available if the cable television system enjoys no economic advantage in providing good programs and cannot pay for good programs.

The cable system owner who delivers video programs to subscribers for a fee, and who must pay for the motion picture programs, is motivated to offer as few pictures, and the lowest cost pictures, that he can without loss of subscribers. Many cable television systems offer customers almost no additional program material except to the extent that they make available more "stations" to the viewer who lives within range of few television broadcast stations. The cable systems introduce little or no competitive incentive to better programming.

DISCLOSURE OF INVENTION

It is the purpose of this invention to provide apparatus and a system and a method of program distribution which will permit compensation to video program suppliers in proportion to consumer acceptance of their programs.

A related purpose is to provide a system in which local advertizing in cable television systems is made feasible.

Another purpose is to provide a system and program distribution method by which a cable television system operator will be economically motivated to provide subscribers with a wide choice of better video programs.

One important factor in the system of the invention is the provision of a means for interrupting the delivery of program material to subscribers in the event the service has not been paid for. To be effective, that interruption means must be one that the subscriber cannot defeat, and the provision of such a means is another feature of the invention.

Systems according to the invention are arranged to deliver more programs to the subscriber simultaneously so that program selection is possible. The preferred system includes a means by which the cable system operator can determine which program is displayed at each subscriber's receiver. Having that information makes it possible to compensate program suppliers in proportion to the amount of viewer acceptance of the program. The cable system operator who must pay only in proportion to viewer acceptance can have the benefit of competition among program suppliers. He then has a way to share the risk of supplying more expensive program material to his subscribers.

The preferred form of the invention includes a means by which the cable operator may interrupt selected programs while not interrupting others of the programs that he applies to the common distribution cable. That feature provides several benefits. It permits separate pricing for permium programs. Perhaps more importantly, it permits the cable operator to provide a "free" program to subscribers who have not paid the subscription fee. The "free" channel can be used to convey local advertizing messages as well as public service messages in exchange for electrical power to energize the subscribers' part of the system.

The invention is applicable to existing as well as to new cable television distribution systems, so it is applicable to growing systems. The preferred system, then, is one that can accommodate different cable system arrangements and program source arrangements. It may incorporate different features of the invention and different portions of the system. Complete disclosure of a preferred form of the invention is left to the Description of the Preferred Embodiment below, but by way of summary, the preferred embodiment is arranged for the delivery to subscribers of video programs in the manner set out in the following paragraphs.

Program material is supplied in the form of modulation of a carrier signal which the subscriber can demodulate in a television receiver or television monitor. Associated with each subscriber is a "street unit" located underground in the street, or on a telephone pole, or otherwise placed, in the manner of water and gas meters and street shut-off valves, where they are substantially secure from tampering.

A number of the street units, called "remote switching stations," are connected to the common video signal transmission line or paths. Signal transmission from the remote switching station to the subscriber's receiver is made through that subscriber's transmission line extension. The remote switching station of preferred form includes a connection from a common video transmission line or light path to the subscriber's extension through a "switch" which can be operated to interrupt or complete the connection. In the preferred embodiment, the switch comprises a means for preventing any output signal or output signals at selected frequency from reaching the subscriber receiver, whereby program delivery can be interrupted if the subscriber has not paid for program delivery.

A means for operating that switch is provided, and control of its operation is placed at the sending station. The sending station is arranged to impress several video programs simultaneously on the common tranmission line. It may comprise apparatus assembled at one place to play recorded video and audio programs to modulate carrier signals with video and audio signals, or to receive on the air signals and retransmit them along the cable. On the other hand, the sending station may include apparatus at local motion picture theaters for producing electronic video and audio signals from the film and introducing them to common video transmission cable.

Selection of one program, of several, is made possible because each modulates a carrier of different frequency. Selection is made by frequency selective filtering or by heterodyning and detection.

It is possible to send all program material to the remote switching unit at carrier frequencies which, when mixed with a single local oscillator signal, will result in conversion to standard television channels. On the other hand, the program material may be impressed on carriers which are converted to standard television channels by local oscillator signals which have a different frequency for conversion to the several channels, or a single unused channel. While it is preferred, now, to provide a system which is compatible with existing television receivers, it may be desirable in some circumstances to deliver program material to a video monitor which can accommodate inputs at other than the standard channel frequencies.

The invention is compatible with any of these systems, and with combinations of them, and with other alternative arrangements. In the preferred embodiment, program selection is made by the subscriber at or near his television set or monitor. Selection information is furnished to the remote switching unit where control is exercised over whether the selected program is or is not furnished. The selection information may, for example, comprise a signal which selects a local oscillator frequency or which programs a frequency selective disabelling unit or other arrangement such as the one now preferred. In the preferred arrangement, a mixing signal generated by a subscriber controlled frequency synthesizer is supplied to a mixer in the remote switch unit. The mixing signal is identified in the remote switching unit and, after conversion to digital form, is compared with digital words which are entered into a comparitor by the cable system operator. The comparitor output is applied to prevent or permit passage of selected programs to the subscriber.

The comparitor may be programmed through the video transmission line or through an auxilliary link such, for example, as the telephone line. Use of the telephone line is attractive because the telephone line to each subscriber is unique to that subscriber. That simplifies programming the remote switching unit and, as will be apparent later, it simplifies integrating the remote switching units to recover data concerning which programs were viewed by the subscriber.

It is a feature of the invention to provide a means for determining, and to determine, which programs were selected by the subscriber. The preferred embodiment keeps what amounts to a chronological record of subscriber program selection. That can be accomplished according to a variety of programs in a computer. It is now preferred to convert the subscriber selected mixing frequency to a digital number which identifies a mixing frequency or channel. At regular intervals that number and the time are stored in a memory unit in the remote switching unit. The memory address is indexed with each data entry. Periodically the memory unit is read through the cable or telephone or other line and the memory is cleared and readied to receive a new series of data.

Because the speed of computers is so high relative to line and frame generation times at the television set or monitor, it is entirely possible to send programming information to the remote switching units and to integrate them during program transmission. That is done now in various applications. The usual system replaces one video line in each frame or in certain frames with digital information. Persistance at the viewer's eye makes the digital information and the picture interruption undetectable by the viewer. That, or some other "continuous" control and integration system may be desirable in some systems, but for the local cable system, control and integration once a day, perhaps in early morning hours, is adequate and now preferred.

These and other objects, advantages and features of the invention will be apparent upon a reading of the detailed description of the preferred embodiment. It is to be understood that other embodiments are possible.

BRIEF DESCRIPTION OF THE DRAWING

In the drawings:

FIGS. 1, 2 and 3 are diagrams, partly in schematic form and partly in block form.

FIG. 1 represents a system according to the invention, and

FIGS. 2 and 3 represent the SELECTOR and the SWITCH unit, respectively, of FIG. 1.

DESCRIPTION OF THE PREFERRED EMBODIMENT

The system shown in FIG. 1 of the drawing, generally designated 10, is arranged for the display of program material on conventional television receivers. Two receivers, 12 and 14, are shown, and they represent the receivers of two different subscribers. Television receiver 12 is associated with a selector unit 16 which is connected to a low frequency antenna 18 and a high frequency antenna 20, and to a source of electrical power by a power cord 22. A coaxial cable 24 interconnects the television receiver and the selector unit. The selector 16 is connected to a remote switch unit 26 by three lines. Line 28 is a coaxial cable by which program material is furnished from the switch unit to the selector. The line 30 is a coaxial cable by which mixing signals are furnished from the selector to the switch unit 26. The third line, line 32, is a power line by which electrical energy is supplied to the switch unit 26 from the selector 16. Line 34, which terminates at the symbol "X," is a line that connects to the telephone system. In this embodiment, it connects to the telephone line that is unique to the subscriber identified with television receiver 12. Television receiver 14 is connected by a line 35 to a selector 36 which is connected in turn by lines 37, 38 and 39 to a switch unit 40. These several units are connected to antennas and to power lines and to the telephone system in the same manner as are television receiver 12 and selector 16 and switch unit 26. They represent the apparatus that is associated with a different subscriber. Both of the switch units are connected to a common video program supply line 42. Line 42 is connected to the switch unit 26 by a program line 44, and line 42 is connected to switch unit 40 by a program line 46.

The function of line 42 is to receive program material from a source and delivery it to the switch unit associated with each of the system's subscribers. In the preferred form of the invention, the switch unit is located in the street or on the telephone pole, or is otherwise positioned, so that it is close to the home or other structure occupied by the subscriber, but is placed to prevent tampering and theft of program material. One of the functions of the switch unit is to preclude furnishing of program material to the subscriber unless the subscription price has been paid. Another function is to prevent the selection of specific program material from time to time unless the premium has been paid. Still another function of the switch unit is to permit the passage of selected program material to the subscriber whether or not the subscription price has been paid. In some cases, the criteria for determining whether or not program material will or will not be furnished to a subscriber may be something other than subscription or other payments.

In the usual case, the television receiver and the selector unit will occupy a place in the subscriber's home or other structure, and it will include switches, in addition to the switches of the television receiver, by which to select "off the air" signals arriving at the antennas or program material that is furnished from the video program supply line 42 through the switch unit to the selector. In the preferred system, electrical power for operation of the switch unit is furnished by the subscriber. That is not essential for successful operation of the invention. It is entirely possible, instead, for the cable operator to purchase the power which is supplied directly from the power distribution system to the switch unit.

Line 42 is connected to the output terminal of a radio frequency generator or television transmitter 50. The output of the generator is modulated by a modulator 52 with video and audio signal information. It is the purpose of this system to make available to the subscriber a number of different programs simultaneously, and to provide the subscriber a means to select those programs one at a time for display on his receiver. To that end, the system includes a means for mixing a number of programs at a mixer 54 for simultaneous application to the modulator 52. In the system shown, one of the inputs to the mixer is applied through an amplifier 56 from an antenna 58. Another input to the mixer is the output of a camera 60 which is arranged to receive an image from a theater projector 62 while the program is being projected on the theater screen. That there may be other sources of program material is indicated by the addition of a box 64 labelled "OTHER PROGRAM SOURCE" whose output is applied to the mixer. That other program source might be a live camera or a video tape play-back machine, or the like.

To permit subscriber selection and control of what the subscriber can select is one facet of the invention. Another is the provision of means for determining what program material was selected. The provision of that facility has several objects, among them to enable determination of the number of subscribers who watched, or at least who selected, each of the programs that were made available. There are a number of existing systems for doing that. One that has exactly that purpose is used by the television industry to rate viewer acceptance of programs and to establish charges for television advertizing. Ratings by that system are ordinarily referred to Nielson Ratings. Other systems capable of doing the same thing are available, although they ordinarily have a different purpose.

In this preferred embodiment, the switch units include a time identified chronological record of program selection and a means by which that information can be transmitted either through the telephone line 34 or through the video program transmission line 42 to a decoder and encoder 66 on a command signal from that unit whiche identifies the switch units one at a time. The data received through the unit 66 is recorded in a unit labelled "RECORD DATA" and numbered 68 in the drawing.

Thus far described, the system has relied upon a video transmission line 42, ordinarily a coaxial cable, for the transmission of signals from the television transmitter 50 to the several switch units. It is not necessary to rely on hardwire interconnection of the transmitter and the switch units, however, because of advancements in laser technology. It is now possible to modulate laser signals at television frequencies, to transmit output light over appreciable distances there to intercept the light and to reconvert it to electrical signals. The use of light paths through the air for signal transmission is not practical in every local and circumstance. Nonetheless, it has proven to be practical in certain circumstances, and it has the advantage that easements need not be procurred and cable laid over part, or even all, of what is here called a "cable system." This preferred embodiment includes apparatus for utilizing that laser technology. Output line 70 from the television transmitter 50 is applied by line 70 to a radio frequency to light conversion apparatus 72 which excites a laser 74 the output of which is received by light receiver 76. That light is converted back to radio frequency energy in a light to radio frequency converter 78. The output of that unit is applied to line 42 so that it represents an alternative to transmission along part of the line 42.

All of the apparatus indicated in FIG. 1 is known, readily available, and standard apparatus, except that the selectors 16 and 36, and the switch units 26 and 40, are not standard. They are, however, comprised of standard units as shown in FIGS. 2 and 3.

FIG. 2 is a diagram of the selector unit. In FIG. 2, the center conductor of a coaxial cable connector 100 has its shield portion connected to ground, and its center conductor connected to the pole of a single-pole, triple-throw switch 102. The switch can interconnect the connector 100 with any one of a VHF antenna 104, a UHF antenna 106, and a video line 108 which is connected to another coaxial connector 110. It is this connector that is ordinarily connected to coaxial line 28 in FIG. 1. The connector which is connected to coaxial line 30 in FIG. 1 is labelled 112 in FIG. 2. Its center conductor is connected to the output of a frequency synthesizer 114 whose function is to synthesize mixing frequencies which, in the switch unit, will convert program signals into signals at television channel frequencies. The most common signal synthesizers employ crystal oscillators whose output can be hetrodyned to generate output signals at selector frequencies. A selector switch is arranged to provide switching schemes that permit generation of the desired outputs. In FIG. 2, the selector switch is identified by the reference numeral 116. The selector unit also includes a power supply unit 118 which receives alternating electrical power at input line 22 and furnishes output power at line 32, which is suitable for operation of the several components within the switch unit. In addition, the power supply unit furnishes power to the frequency synthesizer.

FIG. 3 is the diagram of the components that make up switch unit 26. It includes two coaxial connectors 200 and 202 which are arranged for connection to lines 28 and 30 of FIG. 1, respectively. At the opposite side, it includes a coaxial connector 204 which is arranged for interconnection with the video supply line 44 in FIG. 1. There is provision to receive the input power line 32 as indicated by the symbol "Y." However, for the sake of clarity, the power lines to the several units have been omitted. Another connector is arranged for connection to the telephone line 34. Within the switch unit 26, that connector is connected by a line 206 to a conventional telephone coupler unit 208. Its function is impedance matching and isolation of the telephone line. The coupler is bi-directional. It receives signals from a decoder 210 and it furnishes signals to a switch 212 by line 213. The output of the switch controls operation of a unit 214 which is capable of reading the contents of a memory unit one address at a time, in succession. The output of that read memory unit is furnished to the decoder 210 and thence to the coupler 208, and by line 211 to connector 204. The switch 212 can also be operated by a comparator 280 one of whose outputs is connected by line 218 to the switch 212.

The switch unit 26 also includes a mixer 220 which combines inputs, one by line 222 from coaxial connector 202, and the other by line 224 from coaxial connector 204 to produce an output signal which is supplied by line 226 to the coaxial connector 200. The signal furnished on line 224 from connector 204 is the video program material that arrives on line 44 in FIG. 1. The signal applied by line 222 from connector 202 is the output of the frequency synthesizer 114 of FIG. 2 which appears at the coaxial connector 112. Some of the output of the frequency synthesizer (or mixer) is sampled by a frequency to DC converter 228. The sample is applied from line 222 or line 206 through switch 225 by line 230. The output of the frequency to DC converter is applied to an analog to digital converter 232 which has two output signals. One is applied to latches 236, and the other is applied by line 238 to decoder 240. The output of the latter is applied by line 242 to the comparator 216. Another line 243 connects the comparator 216 to line 224 to permit change of comparison numbers in comparator 216 from the coaxial line at connector 204 or from the telephone line 34 through coupler 208.

The output of the latch unit 236 is applied to a memory unit 244 which stores the shift register output and the output of a clock 246. The clock is connected to the unit to control transfer of information to memory and by line 248 to furnish time signals to the memory unit. It is not essential that data be entered into the memory continuously. It is usually sufficient if information is entered at intervals of several minutes. In practice, the frequency is adjusted in view of the amount of information that it is thought desirable to collect.

The output of the memory is applied by line 250 to the read memory unit 214. Finally, the physical arrangement in FIG. 3 includes an input connection to the comparator unit 216 from the program supply line 214, a connection from the output of the comparator 216 to the input of a disable unit 252 whose output is applied to the mixer and whose function is to prevent operation of the mixer in response to signals from the comparator.

The switch unit performs several functions which are defined as follows. The basic function of the switch unit is to receive program material at coaxial cable 204 and mixing signals at coaxial connector 202, to combine them in the mixer 220 and provide an output signal to the coaxial connector 200 which can detected or decoded as video and audio programs at the television receiver. The mixing signal that appears at terminal 202 is selected by the subscriber. It is necessary to know what that selection is so that the fact of its selection can be recorded and so that a determination can be made concerning whether the mixer is or is not to provide an output signal on the receipt of that mixing signal. The comparison unit 216 can be loaded with digital words transmitted to it through the telephone line 34 and phone coupler 208, or through the program line and program input connector 204.

The words that are stored in the comparator 216 are compared to a word derived from the mixing signal through the combination of the frequency to DC converter 228 and the analog to digital converter 232, and the decoder 240. If the output word from the decoder 240 does not match a word that has been stored in the comparator 216, an output signal from the comparator is applied to the disable unit 252 which serves to disable the mixer by interrupting power to the mixer or biasing it to inoperability, or any conventional method.

If the subscriber has not paid the subscription fee, or if he has not paid the premium fee for selected programs, the comparator unit 216 is loaded with appropriate comparison words, or is unloaded, from the decode and encode unit 66 in FIG. 1.

As described above, the output of the analog to digital converter 232 is stored in a latch, and is periodically transferred to memory as a consequence of operation of the clock. In addition, time signals from the clock are applied to memory. The memory unit is arranged so that addresses are indexed. The result is a chronological recording of which, if any, programs had been selected as time progresses. In a preferred arrangement, the memory unit would have capacity for recording the chronology of subscriber selection for a twenty-four hour period. Periodically, for example in the period from 2:00 a.m. to 3:00 a.m., the memory units of all of the remote switch units of the system could be read into the decode and encode unit 66 and then transferred to a permanent record in the record data apparatus 68 such, for example, as a magnetic tape or paper print-out, or the like.

It is necessary, of course, to interrogate the switch units individually. For this purpose, the system includes the second comparator unit 280 in which is stored a word that identifies the subscriber. That word might consist of the subscriber's telephone number. The output of the comparator is applied to the switch 212. When it is desired to interrogate the memory, the word stored in the comparator is transmitted to it by the program supply line 42 through the coaxial cable 204 and line 224. When the received word matches the stored word, output from the comparator triggers switch 212 which activates the read memory unit 214. The output of the read memory unit 214 is applied to the decoder 210 whose output is applied through the phone coupler and line 206 to the telephone line 34, and also by line 282 to the video supply line 42.

An alternative is available. The switch can be activated from the phone line 34 through the phone coupler 208. Because the phone line is dedicated to the subscriber, it can be reached using the subscriber's telephone number.

Although I have shown and described certain specific embodiments of my invention, I am fully aware that many modifications thereof are possible. My invention, therefore, is not to be restricted except insofar as is necessitated by the prior art.

I claim:

1. A video program distribution system for connection to at least two video program receivers switchable to a plurality of channels, comprising:
    a sending station;
    at least two remote switching stations each for association with a respective one of said receivers;
    a video signal transmission line extending from said sending station to both of said switching stations and including a common portion common to both of said switching stations;
    means interconnecting each of said receivers with its respectively associated switching station for conducting video signals from each switching station to its associated receiver and for conducting signals identifying the channel to which each receiver is switched to its associated switching station;
    each of said switching stations comprising switching means for selectively permitting video information to pass from said transmission line to its respectively associated video transmission line extensions; and
    control means operable at said sending station for selectively operating the switching means at each of said remote switching stations.

2. The invention defined in claim 1 which further comprises program introduction means at said sending station for introducing at least two different video programs into said transmission line for transmission together through said common section.

3. The invention defined in claim 2 which further comprises means at said sending station for determining which, if any, of said two different video programs has been selected at each of said two video receivers.

4. The invention defined in claim 3 in which said remote switching station comprises selective program application means operable for applying to each of said transmission line extensions a respectively selected one of said two programs and not the other.

5. The invention defined in claim 3 in which said remote switching means comprises means for applying to said transmission line extensions one of said two video programs independently of operation of said switching means.

6. The invention defined in claim 4 which further comprises program selection means for location in the vicinity of one of said video receivers for operating said selective program application means.

7. The invention defined in claim 4 which further comprises program selection means operable from said sending station for operating said selective program application means.

8. The invention defined in claim 3 in which said control means comprises means for operating the switching means of each of said remote switching stations with signals transmitted to said remote switching stations by said common portion of said video transmission line.

9. The invention defined in claim 3 in which said control means comprises means for operating the switching means of each of said remote switching stations with signals transmitted to said remote switching stations by telephone lines connected to said remote switching stations, respectively.

10. The invention defined in claim 2 in which said program introduction means is operative to introduce said two different programs at different carrier frequencies.

11. The invention defined in claim 10 in which said remote switching stations each comprise mixing means for altering the carrier frequency of programs passed to the transmission line extensions associated with said switching stations, respectively.

12. The invention defined in claim 11 which further comprises subscriber controlled means for applying any of a number of mixing signals to said mixing means.

13. The invention defined in claim 11 which further comprises means for supplying power to said switching stations in the form of two power transmission lines each extending to a respectively associated one of said remote switching means.

14. For use in permitting the reception and selection of one of a plurality of audio-visual programs delivered simultaneously from a program source;
    conversion means for converting the received programs into a form suitable for viewing one program at a time;
    disabling means responsive to signals received from said program source for preventing operation of said conversion means to convert at least one of said received programs to a form suitable for viewing; and
    said conversion means comprising a mixer and a source of mixing signals, and in which said disabling means comprises means for identifying and reacting to selection of said one of said received signals by measuring the frequency of one of the mixing signal or the output of the mixer.

* * * * *